US008614986B2

(12) United States Patent
Cho et al.

(10) Patent No.: US 8,614,986 B2
(45) Date of Patent: Dec. 24, 2013

(54) RANGING BY MOBILE STATION IN LEGACY SUPPORT MODE

(75) Inventors: Hee Jeong Cho, Anyang-si (KR); Ki Seon Ryu, Anyang-si (KR); Jin Sam Kwak, Anyang-si (KR); Hyun Woo Lee, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 12/829,755

(22) Filed: Jul. 2, 2010

(65) Prior Publication Data

US 2011/0194529 A1    Aug. 11, 2011

Related U.S. Application Data

(60) Provisional application No. 61/222,942, filed on Jul. 3, 2009, provisional application No. 61/250,873, filed on Oct. 13, 2009, provisional application No. 61/253,822, filed on Oct. 21, 2009, provisional application No. 61/260,400, filed on Nov. 12, 2009.

(30) Foreign Application Priority Data

Mar. 29, 2010    (KR) .................. 10-2010-0027870

(51) Int. Cl.
*H04W 4/00* (2009.01)
(52) U.S. Cl.
USPC ......... 370/331; 455/403; 455/422.1; 455/436

(58) Field of Classification Search
USPC ................. 370/310–350; 455/422.1–460
See application file for complete search history.

(56) References Cited

U.S. PATENT DOCUMENTS

| | | | |
|---|---|---|---|
| 6,167,282 A | 12/2000 | Hunsberger | |
| 2001/0021654 A1 | 9/2001 | Spratt et al. | |
| 2002/0093922 A1 | 7/2002 | Grilli et al. | |
| 2003/0198179 A1 | 10/2003 | Koo et al. | |
| 2006/0030305 A1 | 2/2006 | Lee et al. | |
| 2008/0259860 A1* | 10/2008 | Ohseki et al. | 370/329 |
| 2009/0092085 A1* | 4/2009 | Ramesh et al. | 370/329 |
| 2009/0161616 A1* | 6/2009 | Ramesh et al. | 370/329 |
| 2010/0002631 A1* | 1/2010 | Cho et al. | 370/328 |
| 2011/0051848 A1* | 3/2011 | Yuk et al. | 375/316 |

FOREIGN PATENT DOCUMENTS

| | | | |
|---|---|---|---|
| RU | 2165682 C2 | 4/2001 | |
| RU | 2261536 C2 | 9/2003 | |

* cited by examiner

*Primary Examiner* — Charles C Jiang
(74) *Attorney, Agent, or Firm* — Birch, Stewart, Kolasch & Birch, LLP

(57) ABSTRACT

Ranging by a mobile station in a legacy support mode is disclosed. According to embodiments of the present invention, S-SFH information transmitted by a base station in a system operating in FDM based uplink mixed mode is configured in a manner different from that of the FDM based uplink mixed mode. And, a mobile station performs a ranging by interpreting S-SFH differently according to a presence or non-presence of the mixed mode. Therefore, the present invention efficiently manages the ranging of the mobile station and reduces unnecessary signaling overhead.

12 Claims, 4 Drawing Sheets

US 8,614,986 B2

RANGING BY MOBILE STATION IN LEGACY SUPPORT MODE

CROSS REFERENCE TO RELATED APPLICATIONS

This application claims the benefit of the Korean Patent Application No. 10-2010-0027870, filed on Mar. 29, 2010, which is hereby incorporated by reference as if fully set forth herein.

This application claims the benefit of U.S. Provisional Application Nos. 61/222,942, 61/250,873, 61/253,822 and 61/260,400, filed on Jul. 3, 2009, Oct. 13, 2009, Oct. 21, 2009 and Nov. 12, 2009, which are hereby incorporated by reference as if fully set forth herein.

BACKGROUND OF THE INVENTION

1. Field of the Invention

The present invention relates to a ranging method of a mobile station in a legacy support mode. Although the present invention is suitable for a wide scope of applications, it is particularly suitable for a mobile station to perform a ranging in a mobile communication system having a legacy system and an advanced system coexist therein using a legacy support frame.

2. Background Art

Generally, a base station in a system capable of supporting both a legacy mobile station and an advanced system mobile station operates in a mixed mode. In the following description, such a mixed mode operation is explained on the assumption that a legacy system is IEEE 802.16e system and that an advanced system is IEEE 802.16m system.

A mixed mode is divided into a WirelessMAN OFDMA region (hereinafter named an L region) supporting a legacy mobile station (i.e., IEEE 802.16e mobile station) and an advanced wireless interface region (hereinafter named an M region) supporting IEEE 802.16m mobile station. In the mixed mode, an uplink (UL) region is operable in a manner that the L and M regions are divided by TDM (time division multiplexing) or FDM (frequency division multiplexing). A ranging channel of the conventional IEEE 802.16e system uses a PUSC structure in diversity mode. On the contrary, a ranging channel of the IEEE 802.16m system uses a subband CRU (contiguous resource unit) structure.

FIG. 1 is a diagram of a TDD frame structure for supporting WielessMAN-OFDMA uplink FDM operation.

Referring to FIG. 1, a frame structure includes a WirelessMAN OFDMA downlink region and an advanced wireless interface downlink region. And, in downlink, the WirelessMAN OFDMA downlink region and the advanced wireless interface downlink region are divided by TDM. Moreover, in uplink, the L region and the M region are divided by FDM. In particular, in time domain, the WirelessMAN OFDMA downlink region, the advanced wireless interface downlink region and an FDM multiplexed uplink region correspond to a WirelessMAN frame having a 5 ms length. In case of the advanced wireless interface frame, the WirelessMAN OFDM downlink region is regarded as a frame offset and a length of 5 ms from the frame offset is regarded as a frame.

Since a system configured to operate by FDM is structurally unable to use different permutations, the IEEE 802.16m mobile station should use a ranging channel structure of the IEEE 802.16e system as it is. In particular, the corresponding system can be designed in a following manner. First of all, a ranging channel is allocated to an L region only in consideration of an overhead. And, the corresponding ranging channel is designed to use by being shared with IEEE 802.16m mobile stations. Alternatively, it is able to design the ranging channel to be allocated to an M region as well as the L region.

SUMMARY OF THE INVENTION

Accordingly, the present invention is directed to a ranging method of a mobile station in a legacy support mode that substantially obviates one or more of the problems due to limitations and disadvantages of the related art.

Generally, a base station capable of supporting IEEE 802.16m mobile stations only informs mobile stations of ranging channel information, information necessary for code generation and the number of codes to use per usage (e.g., initial ranging, handover ranging, etc.) via S-SFH (secondary super frame header). Yet, since the base station of the above-described mixed mode system use different ranging channel structures and code generating schemes, the S-SFH information should be transmitted in a manner of including information suitable for the used ranging channel structure and code generating scheme. And, a corresponding mobile station also needs to interpret the S-SFH in a manner different from that of a case that the IEEE 802.16m mobile station is supported only.

Therefore, in this disclosure, explained are a configuration of S-SFH information transmitted by a base station in a system operating in a mixed mode and a method for a mobile station to perform a ranging by interpreting S-SFH differently according to a presence or non-presence of the mixed mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of performing a ranging in a mobile station, which performs the ranging on a base station in a mobile communication system including a legacy system and an advanced system, includes the steps of receiving S-SFH (secondary super frame header) information from the base station, determining whether a frame configuration used by the mobile communication system supports the legacy system, if the frame configuration supports the legacy system, obtaining ranging channel information for performing an initial ranging, a handover ranging and a periodic ranging from the S-SFH, and performing at least one selected from the group consisting of the initial ranging, the handover ranging and the periodic ranging on the base station using the ranging channel information.

Preferably, the ranging channel information includes ranging channel allocation information, start code information of a ranging channel, ranging code partition information and uplink permbase (UL_Permbase) information.

More preferably, the frame includes a ranging subframe having a first ranging interval for a synchronized mobile station and a second ranging interval for a non-synchronized mobile station, each of the initial ranging and the handover ranging is performed using the second ranging interval, and the periodic ranging is performed using the first ranging interval.

In this case, the ranging channel allocation information includes an allocation periodicity of the ranging subframe and time domain location information of the ranging subframe.

And, the ranging code partition information includes information on the code number (N) of a code group for the initial ranging, the code number (O) of a code group for the handover ranging, and the code number (M) of a code group for the periodic ranging.

Moreover, the mobile station generates codes corresponding to the code number (N) of the code group for the initial ranging, the code number (O) of the code group for the handover ranging, and the code number (M) of the code group for the periodic ranging from an initiation code (S) of the ranging channel according to the initial ranging, the handover ranging and the periodic ranging, respectively using a code generator having a sequence corresponding to the uplink permbase as an initiation sequence.

Preferably, the legacy system is a WirelessMAN OFDMA system and the advanced system is an IEEE 802.16m system.

To further achieve these and other advantages and in accordance with the purpose of the present invention, a mobile station device, which performs a ranging on a base station in a mobile communication system including a legacy system and an advanced system, includes an antenna configured to receive a signal from the femto base station, the antenna configured to transmit a signal to the femto base station and a processor configured to process the signal received via the antenna and the signal transmitted via the antennas, the processor determining whether a frame configuration used by the mobile communication system supports the legacy system if receiving S-SFH (secondary super frame header) information from the base station, the processor obtaining ranging channel information for performing an initial ranging, a handover ranging and a periodic ranging from the S-SFH if the frame configuration supports the legacy system, the processor controlling at least one selected from the group consisting of the initial ranging, the handover ranging and the periodic ranging to be performed on the base station using the ranging channel information.

Preferably, the ranging channel information includes ranging channel allocation information, start code information of a ranging channel, ranging code partition information and uplink permbase (UL_Permbase) information.

More preferably, the frame includes a ranging subframe having a first ranging interval for a synchronized mobile station and a second ranging interval for a non-synchronized mobile station, each of the initial ranging and the handover ranging is performed using the second ranging interval, and the periodic ranging is performed using the first ranging interval.

In this case, the ranging channel allocation information includes an allocation periodicity of the ranging subframe and time domain location information of the ranging subframe.

And, the ranging code partition information includes information on the code number (N) of a code group for the initial ranging, the code number (O) of a code group for the handover ranging, and the code number (M) of a code group for the periodic ranging.

Moreover, if the mobile station device further includes a code generator having a sequence corresponding to the uplink permbase as an initiation sequence, the processor generates codes corresponding to the code number (N) of the code group for the initial ranging, the code number (O) of the code group for the handover ranging, and the code number (M) of the code group for the periodic ranging from an initiation code (S) of the ranging channel according to the initial ranging, the handover ranging and the periodic ranging, respectively using the code generator.

Preferably, the legacy system is a WirelessMAN OFDMA system and the advanced system is an IEEE 802.16m system.

It is to be understood that both the foregoing general description and the following detailed description are exemplary and explanatory and are intended to provide further explanation of the invention as claimed.

ADVANTAGEOUS EFFECTS

According to embodiments of the present invention, S-SFH information transmitted by a base station in a system operating in a mixed mode is configured in a manner different from that of the mixed mode. And, a mobile station performs a ranging by interpreting S-SFH differently according to a presence or non-presence of the mixed mode. Therefore, the present invention efficiently manages the ranging of the mobile station and reduces unnecessary signaling overhead.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Best Mode

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

As mentioned in the foregoing description, in case of operation in a mixed mode, in order to explain S-SFH information to be transmitted as ranging channel information by a base station and a corresponding ranging method in a mobile station, a ranging channel structure and property differences in case of supporting the above-mentioned IEEE 802.16m system only and a ranging channel structure and property differences in case of a mixed mode are described as follows.

First of all, in a mode for supporting IEEE 802.16m only, a base station transmits ranging channel information on an initial ranging and a handover ranging, i.e., ranging channel information on a non-synchronized mobile station via S-SFH and also transmits ranging channel information for a synchronized mobile station, i.e., ranging channel information on a periodic ranging via AAI_SCD message. The present invention relates to information to be transmitted by a base station in a mixed mode via S-SFH and a corresponding ranging method in a mobile station. The initial ranging and the handover ranging in the mode for supporting IEEE 802.16m are explained in detail as follows.

Figure 2:
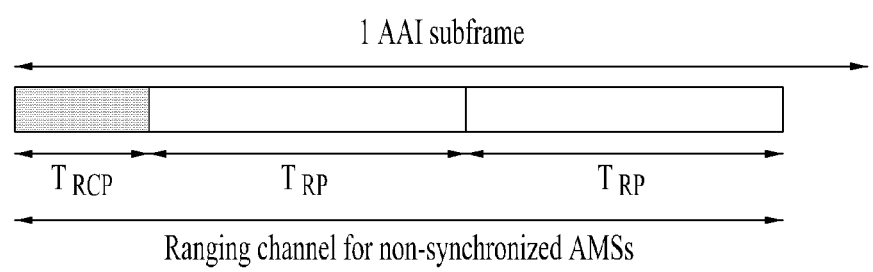
FIG. 2 and FIG. 3 are diagrams of ranging channel formats used in a mode for supporting IEEE 802.16m only.
Figure 3:
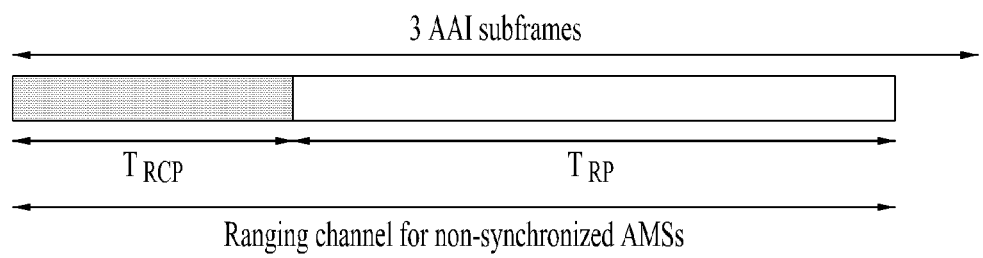

FIG. 2 and FIG. 3 are diagrams of ranging channel formats used in a mode for supporting IEEE 802.16m only.

The format shown in FIG. 2 can be named Format 0 and the format shown in FIG. 3 can be named Format 1. In this case, the ranging channel can occupy a contiguous frequency band (i.e., a localized bandwidth) corresponding to 1 subband.

In FIG. 2 and FIG. 3, $T_{RCP}$ indicates a ranging cyclic prefix region and $T_{RP}$ indicates a ranging preamble region. The ranging formats shown in FIG. 2 and FIG. 3 are usable for a ranging of a non-synchronized mobile station, i.e., for an initial ranging and a handover ranging.

Configuration information on Format 0 and Format 1 shown in FIG. 2 and FIG. 3 are represented as follows.

TABLE 1

| Format No. | $T_{RCP}$ | $T_{RP}$ | $\Delta f_{RP}$ |
|---|---|---|---|
| 0 | $k_1 \times T_g + k_2 \times T_b$ | $2 \times T_b$ | $\Delta f/2$ |
| 1 | $3.5 \times T_g + 7 \times T_b$ | $8 \times T_b$ | $\Delta f/8$ |

In Table 1, $\Delta f$ indicates a subcarrier spacing, $T_b$ indicates a useful symbol duration of OFDMA, i.e., $Tb=1/\Delta f$, $T_g$ indicates a length of CP (cyclic prefix) of OFDMA, i.e., $T_g=G \cdot T_b$, and G indicates a ratio of a useful symbol duration to a CP duration. Meanwhile, $k_1$ and $k_2$ meet the following conditions.

$$K_1=(N_{sym}+1)/2 \text{ and } K_2=(N_{sym}-4)/2 \qquad \text{[Formula 1]}$$

In Formula 1, $N_{sym}$ indicates the number of OFDMA symbols within a single AAI subframe.

Based on the above described structure, in mode for supporting IEEE 802.16m only, ranging channel allocation information (i.e., configuration index and subframe offset ($O_{SF}$)) is shown in Table 2, ranging code information (i.e., number $M_{ns}$ of cyclic shift codes per ZC root index) is shown in Table 3, and ranging preamble code partition information (i.e., $N_{IN}$ and $N_{HO}$) is shown in Table 4.

TABLE 2

| Configurations | The AAI subframe allocating Ranging channel |
|---|---|
| 0 | $O_{SF}{}^{th}$ UL AAI subframe in every frame |
| 1 | $O_{SF}{}^{th}$ UL AAI subframes in the first frame in every superframe |
| 2 | $O_{SF}{}^{th}$ UL AAI subframe in the first frame in every even numbered superframe, i.e., mod (superframe number, 2) = 0 |
| 3 | $O_{SF}{}^{th}$ UL AAI subframe of the first frame in every 4$^{-th}$ superframe, i.e. mod(superframe number, 4) = 0 |

TABLE 3

| | index | | | |
|---|---|---|---|---|
| | 0 | 1 | 2 | 3 |
| $M_{ns}$ | 1 | 2 | 4 | 8 |

TABLE 4

| | Partition Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 0 | 11 | 12 | 13 | 14 | 15 |
| Number of initial ranging preamble codes, $N_{IN}$ | 8 | 8 | 8 | 8 | 16 | 16 | 16 | 16 | 24 | 24 | 24 | 24 | 32 | 32 | 32 | 32 |
| Number of handover ranging preamble codes, $N_{HO}$ | 8 | 16 | 24 | 32 | 8 | 16 | 24 | 32 | 8 | 16 | 24 | 32 | 8 | 16 | 24 | 32 |

A base station is able to transmit the informations shown in Tables 2 to 4 to a mobile station via S-SFH. As mentioned in the foregoing description, in a mode for supporting IEEE 802.16m only, since a base station transmit ranging channel information on initial ranging and handover ranging only via S-SFH, the ranging preamble code partition information, as shown in Table 4, includes the number ($N_{IN}$) of codes of a code group for the initial ranging and the number ($N_{HO}$) of codes of a code group for the handover ranging only.

Figure 1:
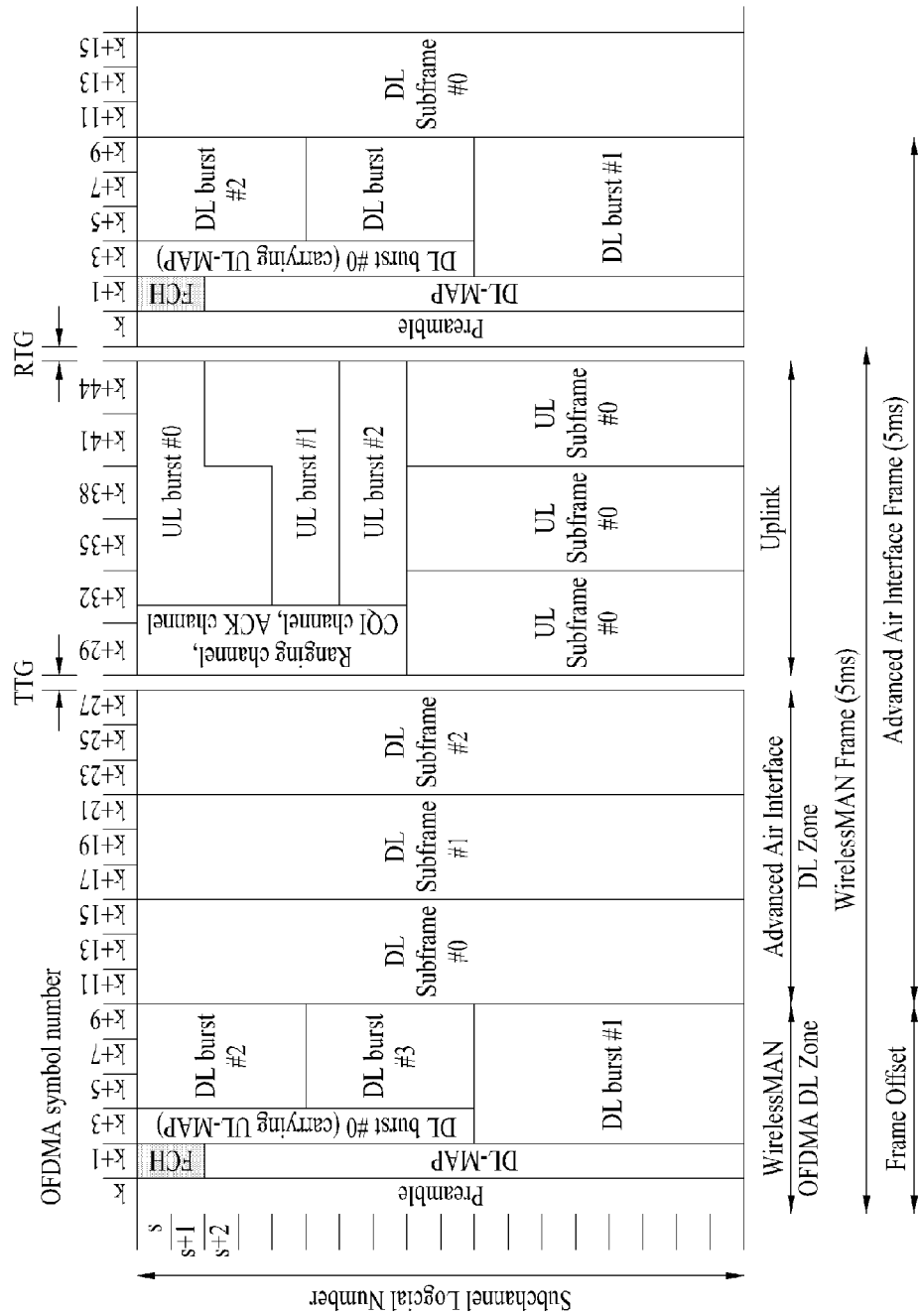
FIG. 1 is a diagram of a TDD frame structure for supporting WielessMAN-OFDMA uplink FDM operation.

Meanwhile, in case of the mixed mode using the frame structure shown in FIG. 1, different ranging channel structures and properties are used.

Figure 4:
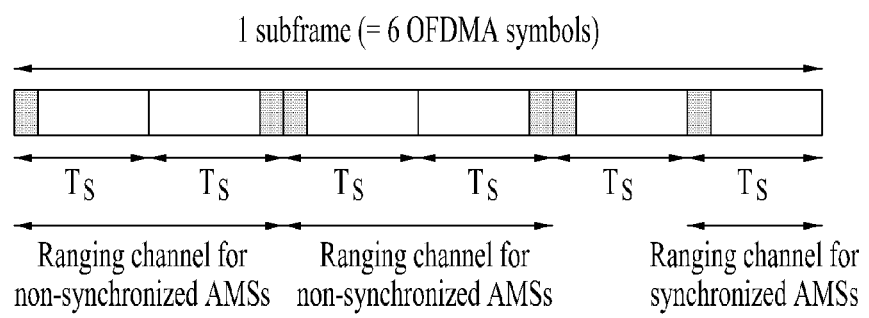
FIG. 4 is a diagram of a ranging channel configuration used in a mixed mode according to one embodiment of the present invention.

FIG. 4 is a diagram of a ranging channel configuration used in a mixed mode according to one embodiment of the present invention.

A ranging channel used for a mixed mode is proposed to include a region for a ranging of a non-synchronized mobile station and a region for a ranging of a synchronized mobile station. Although FIG. 4 shows that two regions for a ranging of a non-synchronized mobile station and one region for a ranging of a synchronized mobile station are included, it is able to just allocate one a region for a ranging of a non-synchronized mobile station.

Referring to FIG. 4, a ranging channel used for a mixed mode has a single format configured in a manner of including a ranging channel region for a non-synchronized mobile station (i.e., initial/handover ranging region) and a ranging channel region for a synchronized mobile station. Hence, according to one embodiment of the present invention, although a base station transmits ranging channel information via S-SFH, the ranging channel information is proposed to include information on a periodic ranging as well as information on an initial ranging and information on a handover ranging. Moreover, since the single format shown in FIG. 4 is used, the base station needs not to transmit ranging channel format information via the S-SFH.

Therefore, a base station according to the present embodiment is proposed to transmit different S-SFH information according to whether UL FDM based WirelessMAN-OFDMA is supported. And, the base station is proposed to transmit information on a case of performing a periodic ranging via S-SFH as well as information on a case of performing an initial ranging and handover ranging using a single-formatted ranging channel. Accordingly, in case of receiving the S-SFH, a mobile station is proposed to determine whether the UL FDM based WirelessMAN-OFDMA is supported. If the UL FDM based WirelessMAN-OFDMA is supported, the mobile station is proposed to obtain information on the initial ranging, information on the handover ranging and information on the periodic ranging from the S-SFH.

In the following description, S-SFH information according to the present invention is explained in detail.

Figure 5:
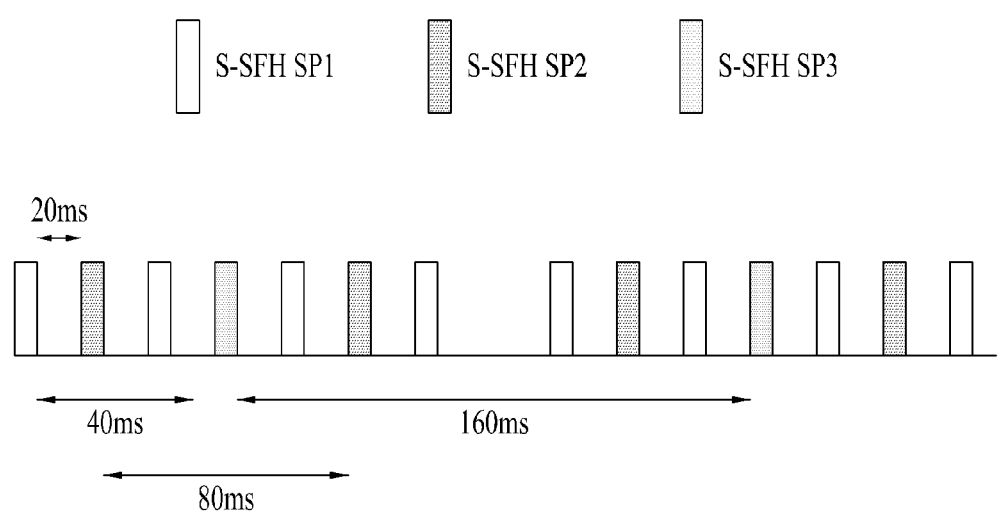
FIG. 5 is a diagram for explaining sub-packet transmission periodicity relation of S-SFH.

FIG. 5 is a diagram for explaining sub-packet transmission periodicity relation of S-SFH.

Referring to FIG. 5, a secondary super frame header (S-SFH) can be transmitted in a manner of being distributed into 3 subpackets SP1, SP2 and SP3. In this case, The S-SFH SP1 mainly includes information for network reentry. The S-SFH SP2 mainly includes information for network entry and discovery. And, the S-SFH SP3 is transmitted by including the rest of major system information. As shown in FIG. 5, the S-SFH SP1 is transmittable every 40 ms, the S-SFH SP2 is transmittable every 80 ms, and the S-SFH SP3 is transmittable every 160 ms.

As mentioned in the foregoing description, according to one embodiment of the present invention, proposed is to enable ranging channel information in a mixed mode to be carried on S-SFH SP1. In particular, the S-SFH SP1 information can be transmitted in a manner that ranging channel information on a case of supporting IEEE 802.16m only and ranging channel information in the mixed mode are included in different formats, respectively. Accordingly, a mobile station receives the S-SFH SP1 and is then able to obtain the ranging channel information on each mode according to whether an operation mode supports UL FDM based WirelessMAN-OFDMA.

In particular, the mobile terminal checks a field indicating a MAC version or a presence or non-presence of WirelessMAN OFDMA UL FDM operation, which is carried on the S-SFH, and is then able to be aware of whether the base station operates in the UL FDM based mixed mode. If the operation mode of the base station is not the UL FDM based mixed mode (e.g., 802.16m only mode, UL TDM based mixed mode, etc.), the mobile station is able to determine that the ranging informations delivered via the S-SFH SP1 are configured as shown in Table 5.

TABLE 5

| Fields | Size [bits] |
| --- | --- |
| Allocation periodicity of the NS-RCH | 2 |
| Subframe offset of the NS-RCH | 2 |
| Start RP code information of the NS-RCH | 4 |
| RP code partition information for the NS-RCH | 4 |
| Number of the cyclic shifted RP codes per root index for the NS-RCH | 2 |
| NS-RCH formats | 1 |

In Table 5, NS-RCH (Non-Synchronized Ranging Channel) means a channel used for an initial ranging and a handover ranging.

If the operation mode of the base station is the UL FDM based mixed mode, the mobile station according to the present embodiment can determine that the ranging informations delivered via the S-SFH SP1 are configured as shown in Table 6 or Table 7.

TABLE 6

| Fields | Size [bits] |
| --- | --- |
| Ranging channel allocation (configuration & LRU index & subframe offset) | 7 |
| Start of ranging codes group | 4 |
| Ranging code partition index | 4 |
| UL_Permbase | 7 |

TABLE 7

| Fields |
| --- |
| Allocation periodicity of the NS-RCH |
| Subframe offset of the NS-RCH |
| Start RP code information of the NS-RCH |
| RP code partition information for the NS-RCH |
| Number of the cyclic shifted RP codes per root index for the NS-RCH |
| NS-RCH formats |

Referring to Table 6, it is recognized that a ranging channel includes S-RCH (synchronized ranging channel: this channel is used for a periodic ranging) as well as NS-RCH (i.e., a channel used for an initial ranging and a handover ranging).

Table 7 shows an embodiment format in case of using a field name used in IEEE 802.16m only mode as it is. In the UL FDM based mixed mode, the meaning of the field can be interpreted in a different manner. The ranging channel information in the mixed mode can include information on S-RCH as well as information on NS-RCH, whereas the ranging channel information in the IEEE 802.16m only mode indicates information on the NS-RCH only. In Table 7, a field 'Start RP code information of the NS-RCH' can be described to be properly used for each purpose as follows:

"For FDM based UL PUSCH region support, this field indicates a parameter $k_{ns}$ for a start code group (s), where $S=4 \times k_{ns}+1$ (i.e., 1, 5, 9 . . . or 65) and a range of $k_{ns}$ meets $0 \leq k_{ns} \leq 15$.".

Meanwhile, the number of cyclic shifted ranging preamble codes per root index for NS-RCH and format information of the NS-RCH are the information unique to a mode for supporting IEEE 802.16m only. In FDM based UL mixed mode, a cyclic shift of a fixed value is applied and, as mentioned in the foregoing description, a ranging channel of a single format is used. Therefore, a mobile station is able to ignore the field 'Number of the cyclic shifted RP codes per root index for the NS-RCH' and the field 'NS-RCH formats' instead of recognizing them as special information.

According to one embodiment of the present invention, if a field indicating a presence or non-presence of WirelessMAN OFDMA UL FDM operation is not explicitly included in the S-SFH SP1, the mobile station reads a MAC version (S-SFH SP2) and is then aware of configurations of ranging relevant fields of the S-SFH SP1. In particular, according to the present embodiment, in case that other fields are configured behind the ranging information, in order for the mobile station to interpret values of other fields (e.g., BS EIRP, Cell bar information, etc.) except the ranging relevant fields despite being unaware of a MAC version value after receiving the SP1, the total bit number of the ranging relevant fields within the SP1 is preferably designed to be equal.

In the following description, intensively explained is a case that ranging information in UL FDM based mixed mode, as shown in Table 6, is provided as a separate format. Yet, as mentioned in the foregoing description with reference to Table 7, the scheme of different interpretation of the ranging channel information on the mode for supporting IEEE 802.16m only is identically applicable unless special limitation.

The ranging channel information carried on S0SFH SP1 in UL FDM based mixed mode, as shown in Table 6, includes: (1) ranging channel allocation information; (2) uplink permbase (UL_Permbase) information; (3) start code information of a ranging channel; and (4) ranging code partition information.

The ranging channel allocation information mentioned in the description of Table 6 can include the following information.

(1) Ranging channel allocation information.

(1-1) A base station is able to indicate that an allocated ranging channel is provided for a normal ranging or a dedicated ranging via S-SFH. If the base station allocates a dedicated ranging channel via the S-SFH, the base station is able to deliver a field for indicating the corresponding allocation via the S-SFH.

(1-2) A base station is able to indicate whether an allocated ranging channel has a usage for an initial/handover ranging or a usage for a periodic ranging via S-SFH. Yet, as mentioned in the foregoing description with reference to FIG. 4, since a ranging channel in a mixed mode has a single configuration physically divided into a ranging channel for a non-synchronized ranging (e.g., initial/handover ranging) usage and a ranging channel for a synchronized ranging (e.g., periodic ranging), the base station needs not to separately indicate this configuration.

(1-3) A base station is able to indicate a resource region on a frequency axis of an allocated ranging channel via S-SFH. Since a ranging channel is allocated based on a logical resource unit (hereinafter abbreviated LRU), the base station is able to transmit a first LRU index, with which the corresponding channel starts, via S-SFH. Yet, according to another embodiment of the present invention, proposed is to determine a resource region on a frequency axis of a ranging channel according to a predetermined location or rule. And, a base station according to this embodiment may need not to indicate it separately via S-SFH. For instance, it is able to define that a ranging channel is allocated from a specific LRU, that a preset rule derived from a cell ID (or IDCell) is used, or that a ranging channel is contiguously allocated ahead of or behind another UL control channel (e.g., feedback channel, HARQ channel, bandwidth request channel).

(1-4) A base station is able to indicate an allocation periodicity of an allocated ranging channel and a resource region location (subframe unit) or a subframe offset via S-SFH. The base station is also able to reuse the fields "allocations periodicity of ranging channel" and "subframe offset" defined in Table 5. In case that these informations are fixed according to a prescribed embodiment of implementation, the corresponding base station may not need to separately inform a mobile station of these informations.

Meanwhile, (2) uplink permbase (UL_Permbase) information mentioned in Table 6 has the following features.

(2-1) UL_Permbase is information used for a mobile station to generate a ranging code set which will be used by a corresponding base station. The base station is able to explicitly deliver this information via S-SFH or AAI_SCD message. If the mobile station is able to calculate/acquire this information from a cell ID (IDCell) obtained via an advanced preamble, the base station may not separately transmit the corresponding information. Yet, the base station has to deliver this information to IEEE 802.16e mobile stations in an L region via UCD message. This is because a subchannel should be configured according to the same permutation rule as the M and L regions divide to use the resource region on a frequency axis. According to the present embodiment, as mentioned in the foregoing description with reference to Table 6, this uplink permbase information is proposed to be carried on S-SFH SP1.

(2-2) The uplink permbase information is usable as an initial sequence value of a code generator (e.g., PRBS generator). In particular, values of the uplink permbase field shown in Table 6 are usable as initial sequences s0 to s6 of the PRBS generator which will be described with reference to FIG. 6 in the following description.

Meanwhile, '(3) start code information of a ranging channel' and '(4) ranging code partition information', which are mentioned in Table 6, can be used by a mobile station in a following manner.

(3-1) The start code information of the ranging channel mentioned in Table 6 (i.e., "Start of ranging codes group and Ranging code partition index") indicates an index (S) of a start code which will be used within a corresponding base station among the generated ranging codes.

(4-1) Ranging code partition information is the information configured to indicate the number (N) of codes of a code group for an initial ranging, the number (O) of codes of a code group for a handover ranging and the number (M) of codes of a code group for a periodic ranging, among total 256 ranging codes. According to the present embodiment, it is characterized in that a value of the O is indicated via S-SFH as well as values of the N and M.

A method o generating a ranging code using the above mentioned informations is described as follows.

Figure 6:
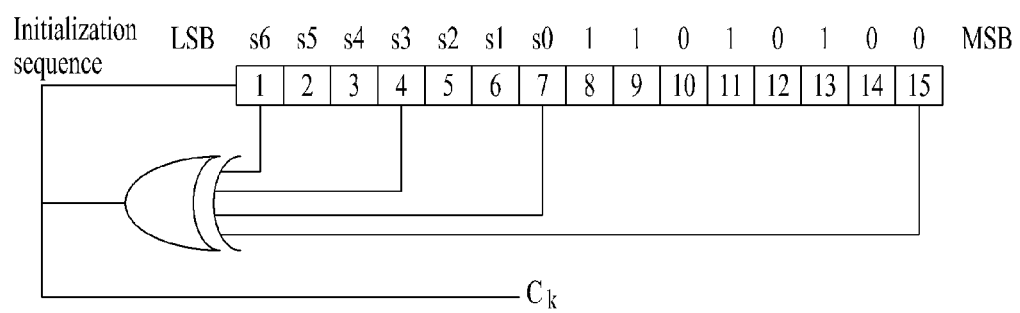
FIG. 6 is a diagram of a PRBS generator configuration using an uplink permbase value as an initial sequence.

FIG. 6 is a diagram of a PRBS generator configuration using an uplink permbase value as an initial sequence.

Referring to FIG. 6, in an initial sequence of a PRBS generator according to the present embodiment, $s6$, $s5$, $s4$, $s3$, $s2$ and $s1$ are used as least significant bits (LSBs) and a sequence '11010100' is used as the rest.

As mentioned in the foregoing description, the number of available codes is 256 (i.e., 0 . . . 255). A base station uses a subgroup (or a code group) of theses codes and each code group is regulated by S (i.e., $0 \leq S \leq 255$). Namely, each code group has codes between S and $((S+O+N+M) \mod 256)$. Code group for each usage is explained as follows.

(a) First N codes are used for an initial ranging. The corresponding codes are generated by activating the aforesaid PRBS generator from '144×(S mod 256)' to '144×((S+N) mod 256)−1'.

(b) Next O codes are used for a handover ranging. The corresponding codes are generated by activating the aforesaid PRBS generator from '144×((S+N) mod 256)' to '144×((S+N+O) mod 256)−1'.

(c) Second next M codes are used for a periodic ranging. The corresponding codes are generated by activating the aforesaid PRBS generator from '144×((S+N+O) mod 256)' to '144×((S+N+O+M) mod 256)−1'.

As mentioned in the above description, the base station according to the present embodiment should deliver the values of the above-defined S, N, O and M to mobile stations. In this case, the S is delivered via the field 'Start of ranging codes group' mentioned with reference to Table 2. The S can be determined by the value of 'Start of ranging codes group (s)' in Table 6. And, the S can be defined as the following formula.

$$S = A \times s + \alpha (0 \leq \alpha, 1 \leq A)$$ [Formula 2]

For instance, in Formula 2, A and α can be defined as specific numerical values (e.g., 4 and 1), respectively. If a size of the field "Start of ranging codes group (s)" is set to x bits, the A can be defined as the value resulting from dividing the total code number 256 by $2^x$.

As mentioned in the foregoing description, the base station according to the present embodiment transmits information on the M via the S-SFH as well as the above described information on the N and O. And, this information can be transmitted as an information field in addition to the information on the N and O. Yet, according to one preferred embodiment of the present invention, the information on all of the N, O and M can be provided as the following table using a ranging code partition index.

TABLE 8

| Partition Index | Number of initial ranging preamble codes, $N_{IN}$ | Number of handover ranging preamble codes, $N_{HO}$ | Number of periodic ranging preamble codes, $N_{PE}$ |
|---|---|---|---|
| 0 | 4 | 4 | 4 |
| 1 | 4 | 8 | 4 |
| 2 | 4 | 16 | 4 |
| 3 | 4 | 24 | 4 |
| 4 | 8 | 4 | 8 |
| 5 | 8 | 8 | 8 |
| 6 | 8 | 16 | 8 |
| 7 | 8 | 24 | 8 |
| 8 | 16 | 4 | 16 |
| 9 | 16 | 8 | 16 |
| 10 | 16 | 16 | 16 |
| 11 | 16 | 24 | 16 |
| 12 | 24 | 4 | 24 |
| 13 | 24 | 8 | 24 |
| 14 | 24 | 16 | 24 |
| 15 | 24 | 24 | 24 |

Information relevant to a periodic ranging (e.g., ranging channel allocation, the number of periodic ranging codes, backoff parameter, start root index of ZC code, etc.) in 16m only mode is delivered via AAI-SCD message. In this case, the start root index of ZC code is necessary to generate codes which will be used as periodic ranging usages and has a root index value different from that of an initial/handover ranging code. Therefore, a base station has to separately transmit the start root index of ZC code for the usage of the periodic ranging code generation.

Yet, since the periodic ranging code is generated in a mixed mode by the permbase according to the same method as well as the initial/handover ranging code, each different start information needs not to be transmitted. Moreover, the "start of ranging codes group" indicating ranging channel allocation including the periodic ranging region information as well as the initial/handover ranging region information and a start point of a used code is already delivered via the S-SFH, it is unnecessary to deliver these informations via the AAI-SCD message.

RADI (random access IOD) used for such a random access procedure as a ranging is designed to include 5-bit super frame index, 2-bit frame index, 2-bit random access opportunity and 6-bit code index. In consideration of this design, a non-synchronized (initial/handover) ranging code and a synchronized (periodic) ranging code should be respectively indexed. A range of a code (initial/handover ranging code), which will be used for a non-synchronized ranging channel, is S≤x<S+N+O. A non-synchronized ranging code index $(0 \sim N_N + N_O - 1)$ can be sequentially mapped from a start point of this range (x).

On the contrary, a range of a code (periodic ranging code), which will be used for a synchronized ranging channel, is S+N+O≤y<S+N+O+M. And, a synchronized ranging code index $(0 \sim N_M - 1)$ can be sequentially mapped from a start point of this range (y). In case of representing 256 codes without these limitations, a code index size of the RAID (random access ID) should be set to 8 bits in design.

Besides, there can exist parameters, which are unnecessary to be transmitted in a mixed mode system, as configurations parameters in IEEE 802.16m only mode system. For instance, in case of UL FDM operation, the PUSC permutation of the conventional 802.16e system should be applied. Hence, the following subband, miniband partition or CRU/DRU partition information such as CRU, DRU and the like is not transmitted or can be ignored.

$UCAS_{SB,0}$: No. of subband based CRU in $FP_0$
$UCAS_{MB,0}$: No. of miniband based CRU in $FP_0$
$UCAS_i$: Total No. of allocated CRU by subband unit for $FP_i$ (i≥0)
USAC: Subband No. $K_{SB}$
UFPC: Frequency partition configuration
UFPSC: No. of subbands allocated if $FP_i$, i>0

The above-described contents of the SFH information according to a presence or non-presence of the WirelessMAN OFDMA UL FDM operation can be configured as Table 9 or Table 10.

TABLE 9

| Syntax | Size (bit) | Notes |
|---|---|---|
| Ranging channel allocation periodicity | 2 | Indicates the periodicity of ranging channel allocation. |
| Subframe offset of | 2 | Indicates the subframe offset ($O_{SF}$) |

TABLE 9-continued

| Syntax | Size (bit) | Notes |
|---|---|---|
| ranging channel | | of ranging channel allocation. The range of values is $0 \leq O_{SF} \leq 3$. |
| If ( FDM-based UL PUSC zone support ) { | | Indicates the WirelessMAN-OFDMA support in the UL with FDM mode, when the Frame Configuration Index in S-SFH SP2 is equal to 5 or 7 or 9 for 5/10/20 MHz channel bandwidth according to Table 765 4 or 6 or 8 for 8.75 MHz channel bandwidth according to Table 766 3 (with CP = 1/8) for 7 MHz channel bandwidth according to Table 767. |
| Start code information of ranging channel | 4 | Indicates the $k_{ns}$ which is the parameter for start of code group (S). $S = 16 \times k_{ns} + 1$ The range of values is $0 \leq k_{ns} \leq 15$. |
| Ranging preamble code partition information | 4 | Indicates the number of initial, handover and periodic codes (N, O and M). |
| Ranging channel location in the frequency domain } else { | 3 | Indicate the start distributed LRU index for ranging channel. |
| Start code information of ranging channel for non-synchronized AMSs | 4 | Indicates the $k_{ns}$ which is the parameter controlling the start root index of ranging preamble codes ($r_{ns0}$). $r_{ns0}(k_{ns}) = 4 \times k_{ns} + 1$ for ranging channel format 0. $r_{ns0}(k_{ns}) = 16 \times k_{ns} + 1$ for ranging channel format 1. The range of values is $0 \leq k_{ns} \leq 15$. |
| Ranging preamble code partition information for non-synchronized AMSs | 4 | Indicates the number of initial and handover ranging preamble codes ($N_{IN}$ and $N_{HO}$). |
| Number of cyclic shifted ranging preamble codes per root index for non-synchronized AMSs | 2 | Indicates the number of cyclic shifted codes per root index ($M_{ns}$) for ranging preamble codes. |
| Ranging channel formats for non-synchronized AMSs } | 1 | Indicates the ranging channel formats number. |

TABLE 10

| Syntax | Size (bit) | Notes |
|---|---|---|
| S-SFH SP1 IE format ( ) { ... | | |
| WirelessMAN-OFDMA support | 1 | Indicates whether frame configuration supports WirelessMAN-OFDMA systems or not 0b0: No support of WirelessMAN-OFDMA 0b1: Support of WirelessMAN-OFDMA |
| If(Support of WirelessMAN-OFDMA with FDM-based UL PUSC Zone){ | | Indicates support of the WirelessMAN-OFDMA with FDM-based UL PUSC Zone, when the WirelessMAN-OFDMA support is 0b1 and Frame configuration index is equal to 5, 7, 9, 11, 13 or 15 for 5/10 MHz channel bandwidth according to Table 780; 4 or 6 or 8 for 8.75 MHz channel bandwidth according to Table 781; 3 (with CP = 1/8) for 7 MHz channel bandwidth according to Table 782. |
| Allocation periodicity of the RCH | 2 | Indicates the periodicity of the RCH allocation. |
| Subframe offset of the RCH | 2 | Indicates the subframe offset ($O_{SF}$) of the RCH allocation. The range of values is $0 \leq O_{SF} \leq 3$. |
| Start RP code information of the RCH | 4 | Indicates the $k_{ns}$ which is the parameter for start of the RP code group ($r_{ns0}$). $r_{ns0}(k_{ns}) = 16 \times k_{ns} + 1$ The range of values is $0 \leq k_{ns} \leq 15$. |
| RP code partition information for the RCH | 4 | Indicates the number of the initial, handover and periodic RP codes ($N_{IN}$, $N_{HO}$ and $N_{PE}$). |
| UL_Permbase | 7 | Indicate UL_Permbase used in WirelessMAN-OFDMA system with FDM-based UL PUSC Zone. |
| Reserved | 6/3 | For 1024 FFT size, 6 bits For 512 FFT size, 3 bits |
| } else { Allocation periodicity of the NS-RCH | 2 | Indicates the periodicity of the NS-RCH allocation. |

TABLE 10-continued

| Syntax | Size (bit) | Notes |
|---|---|---|
| Subframe offset of the NS-RCH | 2 | Indicates the subframe offset ($O_{SF}$) of the NS-RCH allocation. The range of values is $0 \leq O_{SF} \leq 3$. |
| Start RP code information of the NS-RCH | 4 | Indicates the $k_{ns}$ which is the parameter controlling the start root index of the RP codes ($r_{ns0}$). $R_{ns0}(k_{ns}) = 4 \times k_{ns} + 1$ for the NS-RCH format 0. $R_{ns0}(k_{ns}) = 16 \times k_{ns} + 1$ for the NS-RCH format 1. The range of values is $0 \leq k_{ns} \leq 15$. |
| RP code partition information for the NS-RCH | 4 | Indicates the number of initial and handover RP codes ($N_{IN}$ and $N_{HO}$). |
| Number of the cyclic shifted RP codes per root index for the NS-RCH | 2 | Indicates the number of cyclic shifted codes per root index ($M_{ns}$) for the RP codes. |
| NS-RCH formats | 1 | Indicates the NS-RCH formats number |
| $UCAS_{SB,0}$ | 5/4/3 | Indicate the number of subband-based CRUs in $FP_0$ For 2048 FFT size, 5 bits For 1024 FFT size, 4 bits For 512 FFT size, 3 bits |
| $UCAS_{MB,0}$ | 5/4/3 | Indicate the number of miniband-based CRUs in $FP_0$ For 2048 FFT size, 5 bits For 1024 FFT size, 4 bits For 512 FFT size, 3 bits |
| $UCAS_i$ | 3/2/1 | Indicate the number of total allocated CRUs, in a unit of a subband, for $FP_i (i \geq 0)$ For 2048 FFT size, 3 bits For 1024 FFT size, 2 bits For 512 FFT size, 1 bits |
| } ... } | | |

In the following description, a configuration of a mobile station (or a base station), which performs the above mentioned operations, is explained.

Figure 7:
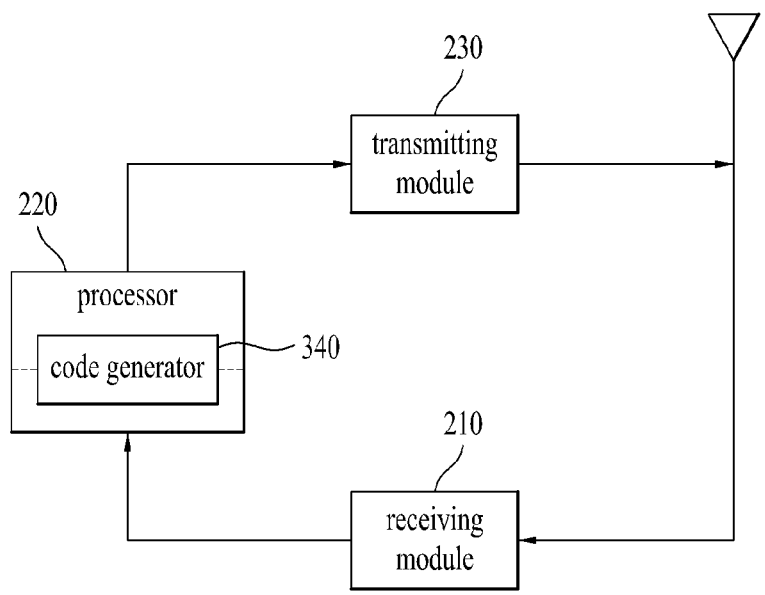
FIG. 7 is a block diagram of a mobile station device configuration according to one embodiment of the present invention.

FIG. 7 is a block diagram of a mobile station device configuration according to one embodiment of the present invention.

Referring to FIG. 7, a mobile station device, which is configured to perform ranging on a femto base station according to the present invention, can include a receiving module 210, a processor 220, a transmitting module 230 and an antenna configured to receive/transmit a signal from/to a base station. And, each of the transmitting and receiving modules 230 and 210 can be a part of the processor 220 according to its implementation. This basic configuration is identically applicable to a femto base station.

Moreover, the processor 220 of the mobile station according to one embodiment of the present invention can further include a code generator 240 configured to generate a ranging code. In this case, the code generator 240 can include the former PRBS generator described with reference to FIG. 6. In particular, the processor 220 is able to control the PRBS generator to generate a ranging code using raging channel information received via S-SFH.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to a mobile communication system.

What is claimed is:

1. A method of performing a ranging with a base station by a mobile station in a mobile communication system, considering an operating mode of the mobile communication system, the method comprising:
   receiving an S-SFH (secondary superframe header) from the base station, wherein the S-SFH includes information indicating whether the mobile communication system supports a WirelessMAN OFDMA;
   obtaining ranging channel information for performing an initial ranging, a handover ranging and a periodic ranging from the S-SFH, when the mobile communication system supports the WirelessMAN OFDMA; and
   performing at least one of the initial ranging, the handover ranging and the periodic ranging with the base station using the ranging channel information,
   wherein the periodic ranging is performed using a first ranging interval allocated in a unit of one symbol period, and wherein each of the initial ranging and the handover ranging is performed using a second ranging interval allocated in a unit of two symbol periods.

2. The method of claim 1, wherein the ranging channel information includes ranging channel allocation information, start code information of a ranging channel, ranging code partition information and uplink permbase (UL_Permbase) information.

3. The method of claim 2, wherein the mobile communication system uses a ranging subframe having the first ranging interval for a synchronized mobile station and the second ranging interval for a non-synchronized mobile station.

4. The method of claim 3, wherein the ranging channel allocation information includes an allocation periodicity of the ranging subframe and time domain location information of the ranging subframe.

5. The method of claim 3, wherein the ranging code partition information includes information on a number of codes (N) within a code group for the initial ranging, a number of codes (O) within a code group for the handover ranging, and a number of codes (M) within a code group for the periodic ranging.

6. The method of claim 5, wherein the mobile station generates codes corresponding to the number of codes (N), the number of codes (O), and the number of codes (M) from an initiation code (S) of the ranging channel according to the initial ranging, the handover ranging and the periodic ranging, respectively using a code generator having a sequence corresponding to the uplink permbase as an initiation sequence.

7. A mobile station device performing a ranging with a base station in a mobile communication system, considering an operating mode of the mobile communication system, the mobile station device comprising:
    an antenna configured to receive or transmit a signal from the base station; and
    a processor configured to process the signal received or transmitted via the antenna, the processor controlling the antenna to receive an S-SFH (secondary super frame header) including information indicating whether the mobile communication system supports a WirelessMAN OFDMA from the base station, the processor obtaining ranging channel information for performing an initial ranging, a handover ranging and a periodic ranging from the S-SFH if the mobile communication system supports the WirelessMAN OFDMA, the processor controlling at least one of the initial ranging, the handover ranging and the periodic ranging to be performed with the base station using the ranging channel information,
    wherein the periodic ranging is performed using a first ranging interval allocated in a unit of one symbol period, and wherein each of the initial ranging and the handover ranging is performed using a second ranging interval allocated in a unit of two symbol periods.

8. The mobile station device of claim 7, wherein the ranging channel information includes ranging channel allocation information, start code information of a ranging channel, ranging code partition information and uplink permbase (UL_ Permbase) information.

9. The mobile station device of claim 7, wherein the mobile communication system uses a ranging subframe having the first ranging interval for a synchronized mobile station and the second ranging interval for a non-synchronized mobile station.

10. The mobile station device of claim 9, wherein the ranging channel allocation information includes an allocation periodicity of the ranging subframe and time domain location information of the ranging subframe.

11. The mobile station device of claim 9, wherein the ranging code partition information includes information on a number of codes (N) within a code group for the initial ranging, a number of codes (O) within a code group for the handover ranging, and a number of codes (M) within a code group for the periodic ranging.

12. The mobile station device of claim 11, further comprising a code generator having a sequence corresponding to the uplink permbase as an initiation sequence, wherein the processor generates codes corresponding to the number of codes (N), the number of codes (O), and the number of codes (M) from an initiation code (S) of the ranging channel according to the initial ranging, the handover ranging and the periodic ranging, respectively using the code generator.

* * * * *